W. F. FOLMER.
CAMERA BACK.
APPLICATION FILED SEPT. 14, 1910.

1,060,748.

Patented May 6, 1913.
2 SHEETS—SHEET 2.

Witnesses
Walter B. Payne
Russell B. Griffith

Inventor
William F. Folmer
By
his Attorneys

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

CAMERA-BACK.

1,060,748.  Specification of Letters Patent.  Patented May 6, 1913.

Application filed September 14, 1910. Serial No. 581,985.

*To all whom it may concern:*

Be it known that I, WILLIAM F. FOLMER, of Rochester, in the county of Monroe and State of New York, have invented certain new and useful Improvements in Camera-Backs; and I do hereby declare the following to be a full, clear, and exact description of the same, reference being had to the accompanying drawings, forming a part of this specification, and to the reference-numerals marked thereon.

My present invention relates to photography and more particularly to photographic cameras, and it has for its object to provide a simple, efficient and convenient form of back for the latter, the improvements being directed in part to the means for holding the recording devices within the back.

The invention has for its further object to provide a revolving back having a simple and cheaply produced means for locking the sensitized material or other recording medium in its different positions while held by the back.

To these and other ends the invention consists in certain improvements and combinations of parts all as will be hereinafter more fully described, the novel features being pointed out in the claims at the end of the specification.

Figure 1:
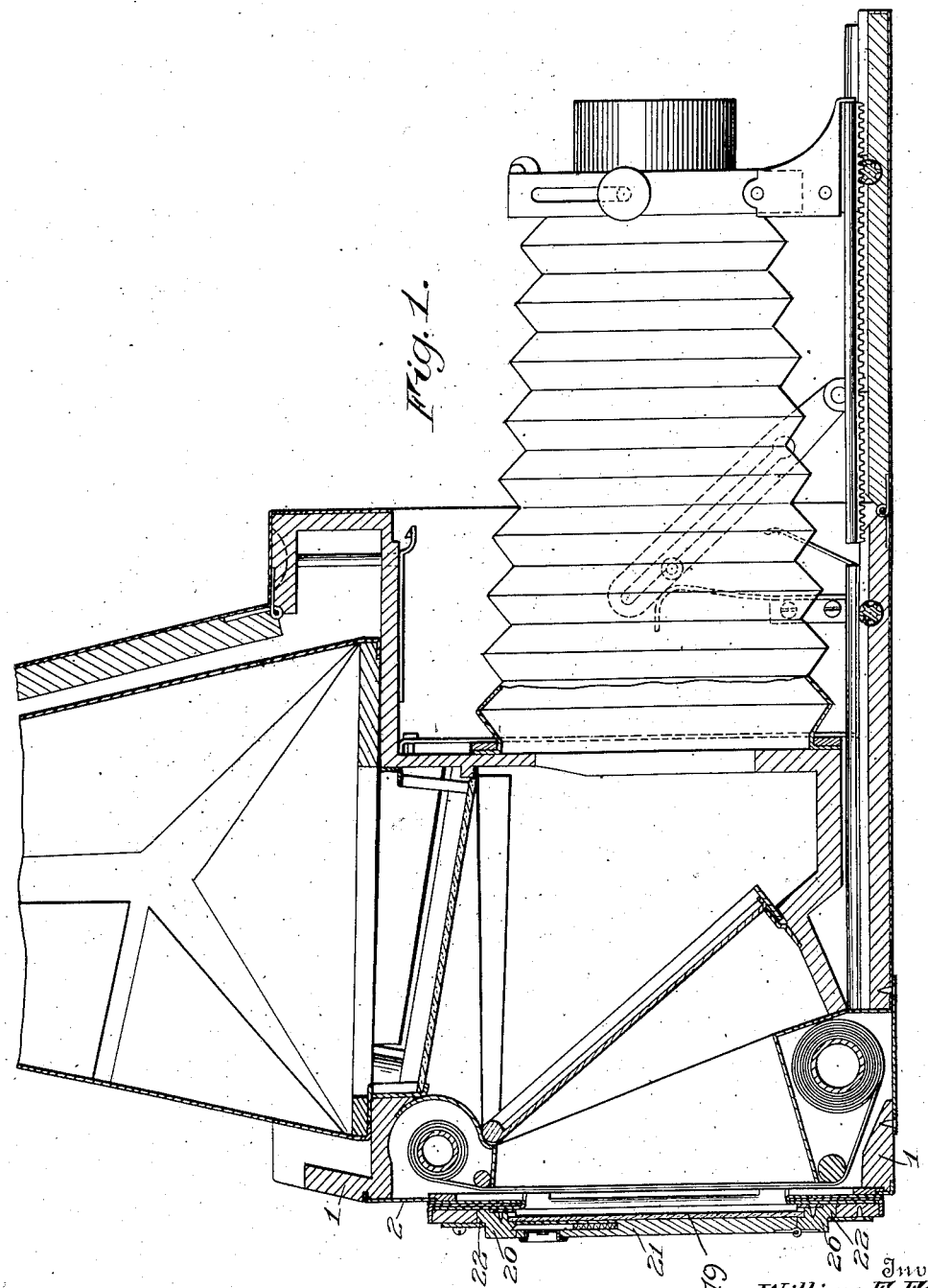
Figure 2:
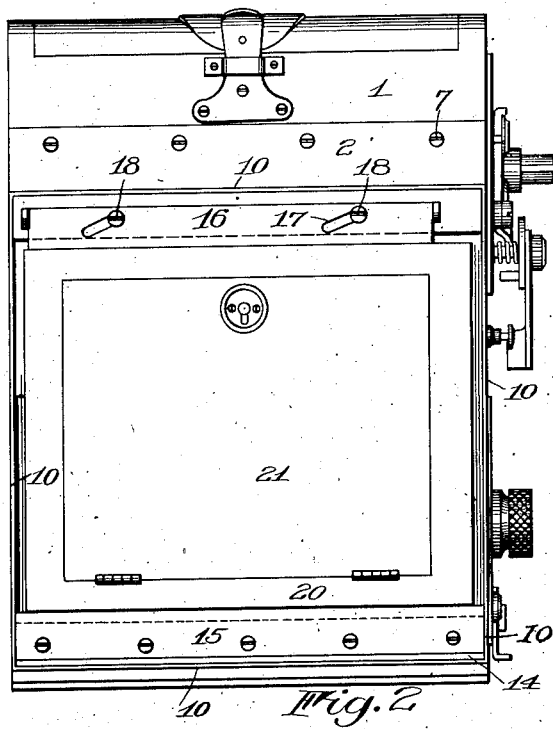
Figure 3:
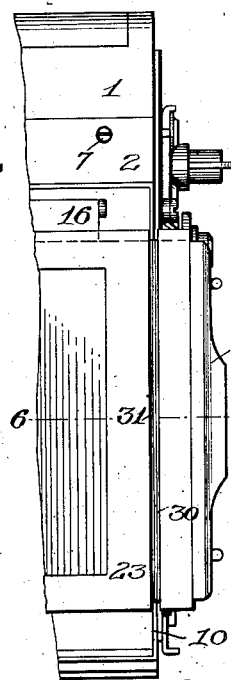
Figure 4:
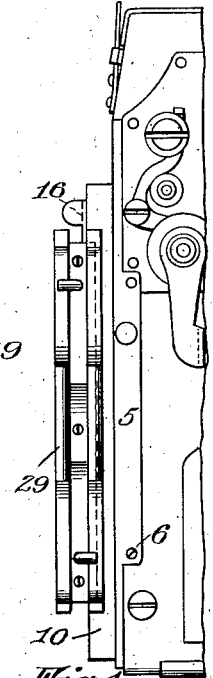
Figure 5:
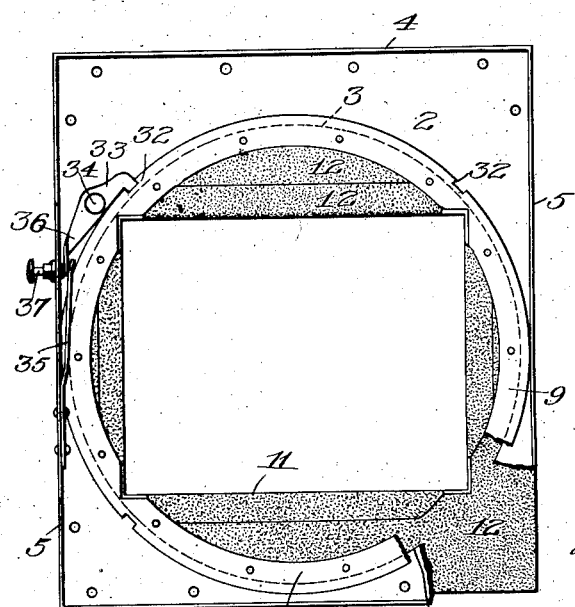
Figures 6, 7:
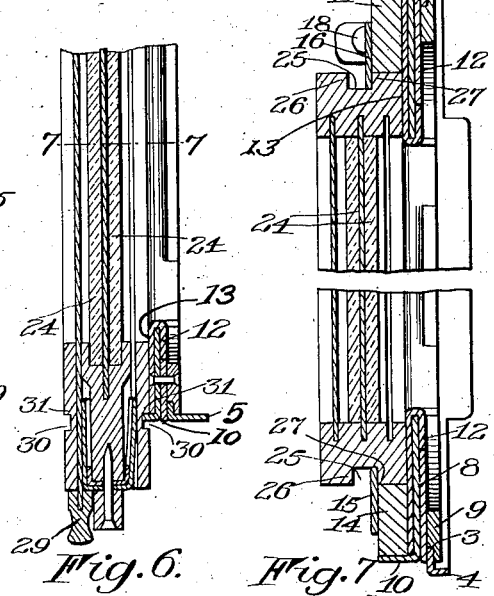

In the drawings: Figure 1 is a central longitudinal vertical section through a camera provided with a back constructed in accordance with and illustrating one embodiment of my invention; Fig. 2 is a rear elevation thereof showing the ground glass screen held by the back; Fig. 3 is a fragmentary rear elevation showing the plate holder substituted for the screen; Fig. 4 is a fragmentary side elevation of Fig. 3; Fig. 5 is a front elevation of the back detached from the camera; Fig. 6 is a detail sectional view taken substantially on the line 6—6 of Fig. 3, and Fig. 7 is a similar view taken substantially on the line 7—7 of Fig. 6.

Similar reference numerals throughout the several figures indicate the same parts.

The camera illustrated in the present embodiment of the invention comprises a box or body 1, the rear end of which is spanned by the attaching plate 2 of the camera back. This plate is preferably made in a continuous sheet, as shown more particularly in Fig. 5, and is provided with a central opening 3 and with rearwardly turned top and bottom flanges 4 and side flanges 5, the latter being utilized in part for the purpose of securing the plate to the camera body as by the fasteners 6. Fasteners 7 are also employed on the rear while the upper and lower flanges 4 are preferably let into the back, as shown. The opening 3 in the plate forms a bearing for a carrying member 8 turning thereon and which is interlocked therewith by means of flanged portions 9 that engage over the edges of the opening on the front side of the attaching plate. The carrier 8 is, itself, also preferably a sheet metal plate having continuous rearwardly turned flanges 10 at its top and bottom and two sides and is provided with a central opening 11 registering with the opening 3 that approximates the size and shape of the sensitized area to be exposed. The front face of the carrier that moves in contact with the attaching plate 2 is preferably covered with felt or velvet 12 to render the joint light-tight, which covering is, in the present instance, extended across the rear face also at 13 to give a close and light-tight contact with the plate and focusing screen hereinafter described.

Arranged on the rear face of the carrier along side of the top and bottom flanges 10 and extending between two side flanges 10 are two bolster strips 14 which I prefer to make of wood and which carry plates 15 and 16 forming locking shoulders, one of which is slotted angularly at 17 to move toward and from the other on guide pins 18 when given a longitudinal thrust.

A ground glass focusing screen 19 is shown held in the back in Fig. 1, the same being mounted in a frame 20 closed at the rear by a door 21 and provided with shoulders 22 at the top and bottom with which coöperate the shoulders 15 and 16 on the back to hold the screen against displacement in a rearward direction while it is held from moving laterally parallel with the back by the side flanges 10 of the carriage. In the other figures an ordinary reversible plate holder 23 is shown held within the back to hold two plates 24 for successive exposures. This plate holder may be of an ordinary type, as stated, except that its opposite edges are grooved out at 25, each groove forming a pair of spaced locking shoulders 26 and 27.

When one side of the plate holder is being exposed the shoulders 15 and 16 on the carrier interlock, respectively, with one of the units of each pair and, when the plate holder is reversed, they lock with the other units and thus prevent the plate holder from becoming detached in a rearward direction. The plate holder is also held from lateral movement by the side flanges 10 on the carrier. It is, however, desirable that one end of the plate holder should project beyond the back in order that the operating portions 29 of the shutters may be readily accessible to the fingers of the operator, as shown in Fig. 3. To this end the right hand flange 10 of Fig. 2 preferably has less depth, as indicated in dotted lines in Fig. 4, permitting it to engage within a channel or groove 30 extending across the end of the plate holder on each face thereof and forming locking shoulders 31 with which the flange coöperates.

The operation and purpose of a revolving back being well known in the art they require no explanation here beyond saying that with the carrier 8 in one position the plate or screen is presented with its greatest dimension lying in one direction while with a quarter turn of the carrier it is presented with its greatest dimension extending in a relatively angular direction for photographing objects of either horizontal or vertical maximum extent. The devices which record the image, namely, the focusing screen and sensitized plate, the one recording it temporarily and the other permanently, are interchangeable on the back through the operation of the movable locking shoulder 16.

In order to lock the carrier 8 in its different positions of adjustment I provide it with a series of abutments 32 formed in the present instance by notches in the flange 9 that interlocks with the attaching plate 2, as shown clearly in Fig. 5, and these abutments are automatically engaged by a latch 33, pivoted at 34 to the front face of the attaching plate 2 and normally traveling on the periphery of the flange 9 under the tension of a leaf spring 35 which coöperates with an arm 36 thereon. To release the latch for the purpose of changing the adjustment, a push button 37 is provided to extend through the securing flange 5 of the attaching plate, which push button engages the arm 36 in opposition to the spring 35. By such an arrangement of parts the back can be easily assembled and then applied to the rear of the camera box or body and it may also be removed without great trouble should this be desired for the purpose of making repairs or to obtain free access to the interior of the camera.

I claim as my invention:

1. In a camera back, the combination with a carrier having a central opening and rearwardly turned flanges and a pair of locking shoulders on the carrier movable one toward and from the other, of a holder for the recording element provided with shoulders coöperating with the flanges on the carrier to prevent a lateral or endwise movement of the holder and having shoulders interlocking with the shoulders on the carrier to prevent disengagement of the holder from the carrier in a rearward direction.

2. In a camera back, the combination with a carrier comprising a plate having a central opening and rearwardly turned flanges, of bolsters arranged on the rear of the plate between the flanges, members forming locking shoulders secured to the bolsters, one of said members being movable toward and from the other, and a holder for the recording element provided with shoulders coöperating with the flanges on the carrier to prevent lateral or endwise movement of the holder and having shoulders interlocking with the shoulders on the carrier to prevent disengagement of the holder from the carrier in a rearward direction.

3. In a camera back, the combination with a carrier having a rearwardly turned flange, of a reversible plate holder having a groove in each of its opposite front and rear faces adapted to coöperate in turn with the flange on the carrier as the holder is reversed to prevent lateral or endwise movement of the holder but allowing its end to project beyond the carrier and interlocking parts on the holder and carrier for preventing disengagement of said members in a rearward direction.

4. In a rotary camera back, the combination with an attaching member comprising a plate having a central opening and provided with a forwardly turned flange forming a means for attaching it to the camera box, of a revoluble carrier having a bearing in the opening and provided with a flanged portion interlocking with the forward side of the plate, a plurality of notches being provided in such flanged portion forming abutments, a latch mounted on the front face of the attaching member and coöperating with the abutments to lock the revoluble carrier in different positions of adjustment, a spring normally tending to throw the latch into engaging position, and an operating device for releasing the latch mounted in the securing flange of the attaching plate.

WILLIAM F. FOLMER.

Witnesses:
RUSSELL B. GRIFFITH,
NELSON COPP.